United States Patent
Kapp

Patent Number: 5,986,870
Date of Patent: Nov. 16, 1999

[54] ELECTRICAL SURGE PROTECTOR WITH PROTECTIVE ENCLOSURE

[75] Inventor: Wilhelm H. Kapp, Goleta, Calif.

[73] Assignee: Joselyn Electronics Systems Company, Goleta, Calif.

[21] Appl. No.: 08/931,682

[22] Filed: Sep. 16, 1997

[51] Int. Cl.⁶ ............................................. H02H 1/04
[52] U.S. Cl. ..................... 361/127; 361/118; 361/131; 340/662
[58] Field of Search ................ 361/91, 111, 117–119, 361/124–127, 131; 340/662, 652, 634, 644

[56] References Cited

U.S. PATENT DOCUMENTS

| | | | |
|---|---|---|---|
| 4,168,514 | 9/1979 | Howell | 361/56 |
| 4,288,833 | 9/1981 | Howell | 361/124 |
| 4,539,487 | 9/1985 | Ishii | 307/44 |
| 4,543,566 | 9/1985 | Buck et al. | 340/512 |
| 4,649,457 | 3/1987 | Talbot et al. | 361/127 |
| 4,740,859 | 4/1988 | Little | 361/56 |
| 4,907,118 | 3/1990 | Hames | 361/56 |
| 5,225,816 | 7/1993 | Lebby et al. | 340/653 |
| 5,231,367 | 7/1993 | Ikeda et al. | 337/28 |
| 5,276,422 | 1/1994 | Ikeda et al. | 337/28 |
| 5,278,771 | 1/1994 | Nyenya | 364/492 |
| 5,303,116 | 4/1994 | Grotz | 361/111 |
| 5,325,087 | 6/1994 | Mikli | 340/635 |
| 5,390,065 | 2/1995 | Allina et al. | 361/56 |
| 5,412,526 | 5/1995 | Kapp et al. | 361/56 |

OTHER PUBLICATIONS

ZoneMaster Series brochure, "A Revolutionary New Generation of Service Entrance & Main Panel Protection", Atlantic Scientific Corporation, 5 pages, Jan. 1993.

Allowed U.S. Serial No. 08/618,342, pp. 1–26 and 8 sheets of drawings, entitled "Electrical Surge Protection System With Condition Monitoring,"—issue fee paid Jun. 6, 1997.

*Primary Examiner*—Michael J. Sherry
*Attorney, Agent, or Firm*—Marshall, O'Toole, Gerstein, Murray & Borun

[57] ABSTRACT

A surge protector module is provided with a housing with an internal space, a separator disposed within the housing which divides the internal space into first and second spaces within the housing, and a surge protection device. The surge protection device has a surge protector mounted within the first space and a disconnect mechanism operable to conductively disconnect one of the terminals of the surge protector from one of the terminals of the surge protection device in the presence of a prolonged overvoltage surge across the terminals of the surge protector. A combustion-retardant material is disposed within the housing of the surge protector module so that it occupies only the first space within the housing, leaving the second space within the housing substantially free of the combustion-retardant material, and the disconnect mechanism is disposed in the second space in which no combustion-retardant material is disposed. Consequently, the presence of the combustion-retardant material does not interfere with the operation of the disconnect mechanism.

20 Claims, 2 Drawing Sheets

ELECTRICAL SURGE PROTECTOR WITH PROTECTIVE ENCLOSURE

BACKGROUND OF THE INVENTION

The invention is directed to an electrical surge protector having a protective enclosure to inhibit catastrophic failure of the surge protector.

Surge protection devices are used to protect components and power systems from prolonged overvoltage surges, such as those caused by lightning for example. During a prolonged overvoltage surge, a surge protection device provides temporary surge protection of a component by shunting the overvoltage surge to ground or neutral. A prolonged overvoltage surge may cause a surge protection device to overheat, thus presenting a fire hazard.

Very high voltage surges, such as those caused by nearby lightning strikes, can cause violent failure of a surge protection device, raising the temperature of the surge protection device and adjacent areas to levels well above combustion temperature for most materials. This high temperature, combined with integral or adjacent combustible materials, and the oxygen in the air adjacent the device can combine in an exothermic reaction causing burning of the device, and subsequent catastrophic damage to equipment, buildings, and personnel.

One method that has previously been used to overcome this danger is to place an enclosure around the components of the surge protection device, and then fill the cavity surrounding the components with a combustion-retardant substance, such as dry electrical-grade silica. The dry electrical-grade silica displaces the air (which contains oxygen) within the cavity, eliminating a critical component of the exothermic reaction, and also provides thermal capacitance to absorb the heat generated by the transient voltage spike, thus protecting adjacent equipment, even if the surge protection device is destroyed.

Recently, perhaps because of power utility deregulation, more power "swells," events where sustained power line voltages greater than the nominal power voltage plus normal regulation (e.g., 240 VAC +10%), are occurring. When these swells exceed the maximum continuous operating voltage of the surge protection device, the device conducts high currents for sustained periods of time, causing prolonged heating and subsequent failure of the enclosure, even when it is filled with dry electrical-grade silica. After the enclosure fails, air permeates the environment, providing oxygen for combustion, and serious fires may result.

Surge protection devices often contain indicator lights, such as light emitting diodes, which are lit when the surge protection device is intact, but extinguish when the device has failed. Since the indicator light is inside the housing of the surge protection device, a viewing port or hole, either exposing the indicator light, or covered by a clear membrane, is provided so that an observer may view the light. If a surge or swell occurs when the viewer is looking at the light, the hot gas generated by the event will expand rapidly and vent through the viewing port, potentially causing bodily harm to the viewer.

SUMMARY OF THE INVENTION

The invention is directed to a surge protector module having a housing with an internal space, a separator disposed within the housing which divides the internal space into first and second spaces within the housing, and one or more surge protection devices disposed within the housing. Each surge protection device has a surge protector mounted within the first space within the housing so that one of the terminals of the surge protector is conductively connected to one of the terminals of the surge protection device and so that another of the terminals of the surge protector is conductively connected to another of the terminals of the surge protection device. The surge protector is operable to conduct current from one of the terminals of the surge protector to another of the terminals of the surge protector in the presence of a prolonged overvoltage surge across the terminals of the surge protector.

Each surge protection device is provided with a thermal disconnect mechanism operable to conductively disconnect one of the terminals of its surge protector from one of the terminals of the surge protection device in the presence of a prolonged overvoltage surge across the terminals of the surge protector. A combustion-retardant material is disposed within the housing of the surge protector module so that it occupies only the first space within the housing, leaving the second space within the housing substantially free of the combustion-retardant material, and the disconnect mechanism is disposed in the second space in which no combustion-retardant material is disposed. Consequently, the presence of the combustion-retardant material does not interfere with the operation of the disconnect mechanism.

Each surge protection device may be provided with a visual indicator, such as a light-emitting diode, disposed within the housing for indicating whether the disconnect mechanism has operated to conductively disconnect one of the terminals of its surge protector from one of the terminals of the surge protection device. A viewing port may be provided in the housing of the surge protector module to allow viewing of the visual indicator.

The surge protector module may also be provided with a venting mechanism for allowing venting of gas from the internal space within the housing to a point outside the housing. The venting mechanism may be composed of a hollow passageway disposed in the housing and a rupturable membrane which seals the hollow passageway.

These and other features of the present invention will be apparent to those of ordinary skill in the art in view of the detailed description of the preferred embodiment, which is made with reference to the drawings, a brief description of which is provided below.

DETAILED DESCRIPTION OF A PREFERRED EMBODIMENT

Figure 1:
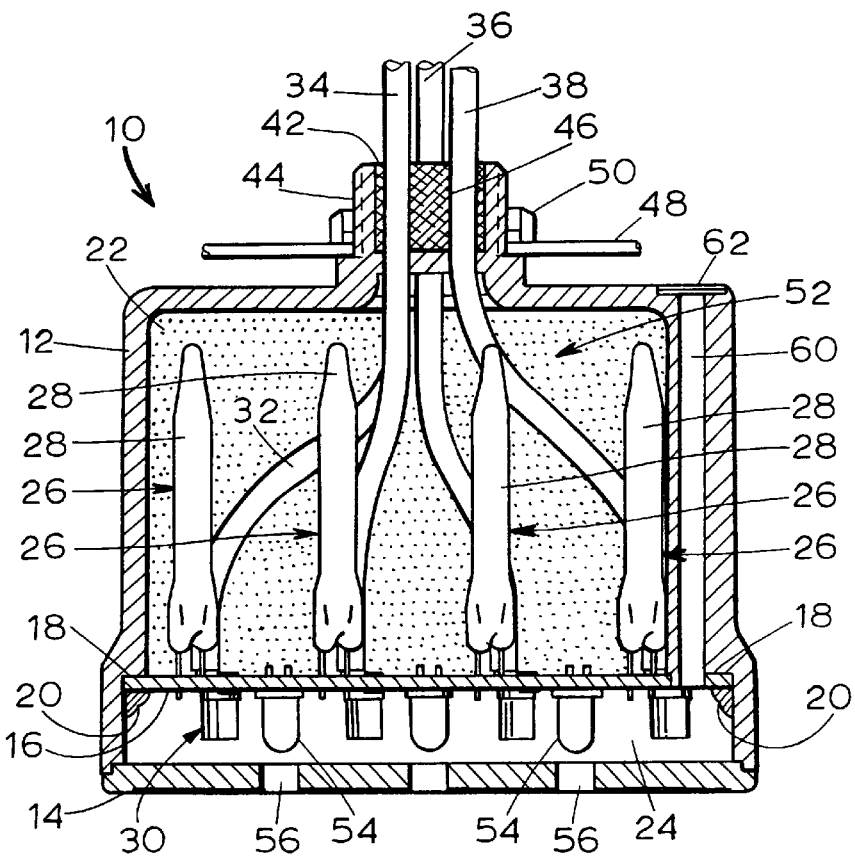
FIG. 1 is a cross-sectional view of a preferred embodiment of a surge protector module in accordance with the invention shown mounted to a mounting plate.

FIG. 1 is a cross-sectional view of a preferred embodiment of a surge protector module 10 in accordance with the invention. The surge protector module 10 is designed to protect a plurality of phases or lines of a multi-phase power line from overvoltage surges.

Referring to FIG. 1, the surge protector module 10 has a plastic housing composed of a box-shaped housing portion 12 and a rectangular housing plate 14 fastened to the housing portion 12 in a conventional manner. A separator plate 16 in the form of a printed circuit board is disposed in the interior space within the housing portion 12. The separator plate 16 abuts a plurality of ledges 18 integrally formed on the interior of the housing portion 12. The separator plate 16 is anchored in place by a sealant 20 disposed along the entire intersection of the vertical wall of the housing portion 12 and the underside of the separator plate 16.

The surge protector module 10 has an upper internal space 22 formed within the housing portion 12 above the separator plate 16 and a lower internal space 24 formed within the housing portion 12 between the separator plate 16 and the housing plate 14. The surge protector module 10 has four surge protection devices 26 disposed therein, each of which is composed of a surge protector 28 disposed in the upper internal space 22 within the housing portion 12 and a disconnect mechanism 30 disposed in the lower internal space 24 within the housing portion 12. The disconnect mechanisms 30, which are described in detail below, operate to conductively disconnect the terminals of the surge protection devices 26 in response to prolonged overvoltage surges.

Figure 2:
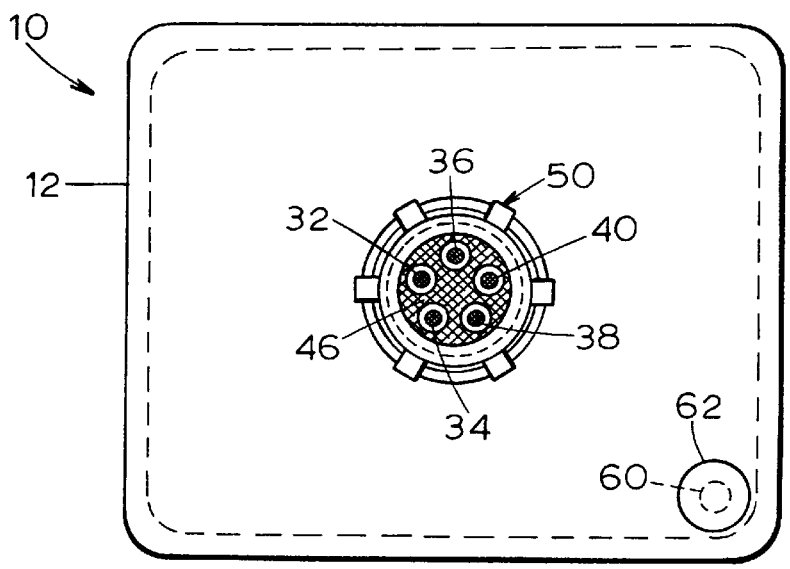
FIG. 2 is a top view of the surge protector module of FIG. 1.
Figure 6:
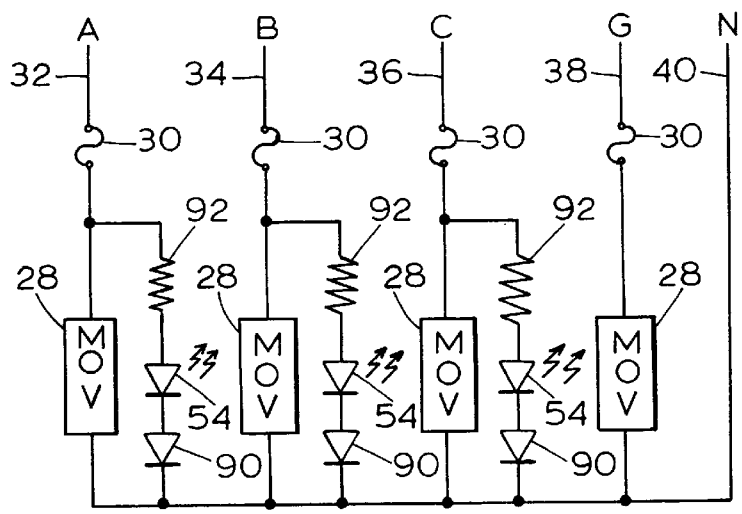
FIG. 6 is a circuit diagram of the surge protector module.

As shown in FIGS. 1, 2 and 6, the surge protector module 10 has five wires 32, 34, 36, 38, 40 which conductively interconnect various points within the module 10 to a multi-phase power line having three power phases A, B, C, neutral and ground. Although the module 10 is shown with five wires designed to protect a three-phase power line, alternative designs could be used to protect power lines having fewer phases.

Each of the wires 32–40 is connected to a respective metallized contact point on the separator plate 16 and passes through a central aperture 42 formed in a neck portion 44 of the housing portion 12. A sealant 46, such as epoxy sealant, is provided in the central aperture 42 in the neck portion 44. The neck portion 44 extends through a circular hole formed in a mounting plate 48 to which the surge protector module 10 is mounted. The exterior of the neck portion 44 is threaded, and the surge protector module 10 is fixed to the mounting plate 48 by a mounting ring 50 threaded on the neck portion 44 over the mounting plate 48.

The entire upper internal space 22 that is not occupied by the surge protectors 28 and the wires 32–40 is filled with a granular, combustion-retardant material 52, such as dry electrical-grade silica particles. The sealant 46 disposed in the neck portion 44 and the sealant 20 disposed beneath the separator plate 16 prevent the combustion-retardant material 52 from leaking from the upper internal space 22. The lower internal space 24 disposed in the surge protector module 10 is substantially free of the combustion-retardant material 52 to allow unhindered operation of the disconnect mechanisms 30.

A plurality of visual indicators 54 in the form of light-emitting diodes are connected to the lower side of the separator plate 16. Each of the visual indicators 54 generates a visual indication which is indicative of the current state of a respective one of the surge protection devices 26, and the housing plate 14 has a viewing port 56 disposed directly beneath each of the visual indicators 54 to allow visual inspection of the visual indicators 54. The viewing ports 56 may be formed of, for example, apertures in the housing plate 14 or portions of the housing plate 14 composed of a transparent material.

The surge protector module 10 has a hollow, venting passageway 60 which has a lower end that is in fluid communication with the lower internal space 24 and an upper end which is covered by a rupturable membrane 62. The purpose of the venting passageway 60 is to prevent injury to a person viewing the visual indicators 54 due to possible escape of hot gases from the lower internal space 24. In the event that pressure within the lower internal space 24 increases beyond a predetermined amount, the increased pressure will cause the membrane 62 to rupture and allow the pressurized gas to escape from the lower internal space 24 to the outside atmosphere via the venting passageway 60. It should be noted that the pressurized gas vents in the opposite direction from a person who would be looking at the viewing ports 56.

Figure 3:
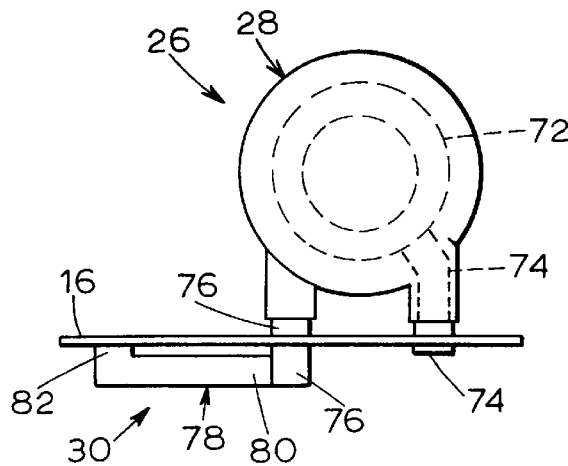
FIG. 3 is a side elevational view of the surge protector module with its housing removed.

The structure of one of surge protection devices 26 is shown in more detail in FIG. 3. Referring to FIG. 3, the surge protector 28 of each surge protection device 26 may be provided in the form of a metal-oxide varistor (MOV) attached to the top side of the separator plate 16. Each surge protector 28 has a pair of electrodes 72 in the form of internal conductive rings which are separated by a portion of metal oxide. The electrodes 72 and the metal oxide are covered by an insulating coating. Each of the electrodes 72 is electrically connected to one of a pair of terminals 74, 76 which pass through the separator plate 16, and the portion of each of the terminals 76 which extends below the separator plate 16 has one of the disconnect mechanisms 30 attached to it. Each disconnect mechanism 30 is composed of a flexible conductor 78 and a portion of solder which conductively interconnects the end of the conductor 78 with the terminal 76.

Figure 4A:
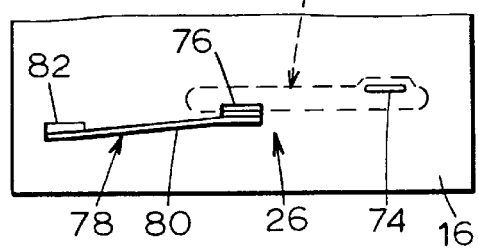
FIGS. 4A and 4B illustrate the operation of a disconnect mechanism associated with one of the surge protection devices.
Figure 4B:
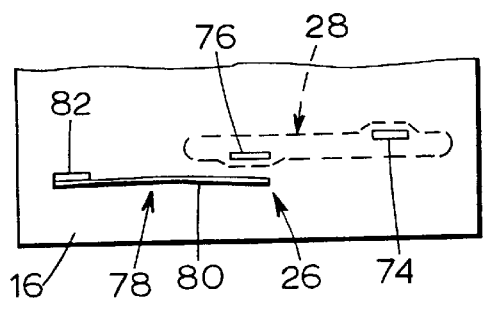
Figure 5:
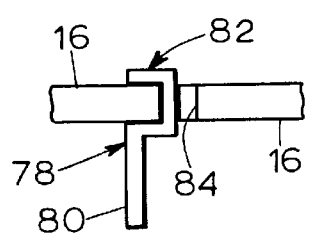
FIG. 5 is a side view of a portion of the surge protector module.

FIGS. 4A and 4B are views of one of the disconnect mechanisms 30 shown from the underside of the separator plate 16. As shown in FIGS. 3, 4A and 4B, the conductor 78 has a flat vertically disposed portion 80 integrally formed with an anchor portion 82 (see FIG. 5, which is an enlarged view of a portion of the separator plate 16 showing the conductor 78) which is disposed in a slot 84 formed in the separator plate 16 to anchor the conductor 78 to the separator plate 16. The anchor portion 82 may be permanently fixed to the separator plate 16 via solder or a low-resistance conductive adhesive.

One of the surge protection devices 26 is shown of FIG. 4A in an intact or ready state in which the terminal 76 is conductively coupled to the end of the conductor 78. In the event an overvoltage surge of sufficient magnitude and duration occurs across the terminals 74, 76 of the surge protector 28, the heat due to the relatively large current passing through the metal oxide portions of the surge protector 28 will melt the solder holding the end of the conductor 78 to the terminal 76, whereupon the end of the conductor 78 will be forced away from the terminal 72, causing the surge protection device 26 to be in a disconnected or inoperable state, as shown in FIG. 4B.

The conductor 78 may be composed of any suitable conductive material that remains flexible at relatively high temperatures, such as a copper-beryllium alloy (e.g. 0.2% beryllium). The flexible conductor 78 may be provided with a predetermined spring bias or arc, or it may simply be a straight metal portion, the end of which is flexed towards the surge protector terminal and held in place against the surge protector terminal by solder.

As noted above, the disconnect mechanisms 30 are disposed below the separator plate 16 in the internal space 24 that is substantially free of the granular combustion-retardant material 22. Consequently, the mechanical operation (i.e. the movement of the conductor 80 away from the terminal 76) of the disconnect mechanisms 30 is not hindered by the presence of the combustion-retardant material 22 within the surge protector module 10.

A circuit diagram of the surge protector module 10 is shown in FIG. 6. Referring to FIG. 6, each of the MOV surge protectors 28 is connected in series with one of the disconnect mechanisms 30 between the neutral line 40 and the other lines 32–38 of the multi-phase power line. Each of the surge protectors 28 connected to the lines 32, 34, 36 is connected in parallel with a series circuit consisting of a diode 90, one of the visual indicators 54, and a resistor 92. In the event of a prolonged overvoltage surge on one of the lines 32–38 relative to the neutral line 40, the disconnect mechanism 30 for that line will become disconnected, as shown in FIG. 4B, and an open circuit will be formed between that line and the neutral line.

The lines 32, 34, 36 are connected to the line voltage, such as 120 volts. In the absence of one of the disconnect mechanisms 30 creating an open circuit between the lines 32, 34, 36 and the neutral line 40 due to a prolonged overvoltage surge, the visual indicators 54 will be illuminated due to the voltage across them. If one of the disconnect mechanisms 30 operates to create an open circuit between one of the lines 32, 34, 36 and its respective surge protector 28, the visual indicator 54 associated with that disconnect mechanism 30 will become extinguished due to the open circuit.

Numerous modifications and alternative embodiments of the invention will be apparent to those skilled in the art in view of the foregoing description. This description is to be construed as illustrative only, and is for the purpose of teaching those skilled in the art the best mode of carrying out the invention. The details of the structure and method may be varied substantially without departing from the spirit of the invention, and the exclusive use of all modifications which come within the scope of the appended claims is reserved.

What is claimed is:

1. A surge protector module, comprising:

a housing having an internal space;

a separator disposed within the housing which divides said internal space into a first space within said housing and a second space within said housing;

a surge protection device disposed within said housing, said surge protection device having a pair of device terminals, said surge protection device comprising:

a surge protector mounted within said first space within said housing, said surge protector having a pair of protector terminals, one of said protector terminals being conductively connected to one of said device terminals and another of said protector terminals being conductively connected to another of said device terminals, said surge protector being operable to conduct current from one of said protector terminals to another of said protector terminals in the presence of an overvoltage surge across said protector terminals; and a disconnect mechanism operable to conductively disconnect one of said protector terminals from one of said device terminals in the presence of a prolonged overvoltage surge across said protector terminals, said disconnect mechanism being mounted within said second space within said housing; and a combustion-retardant material disposed within said housing, said combustion-retardant material occupying said first space within said housing while leaving said second space within said housing substantially free of said combustion-retardant material so as to allow operation of said disconnect mechanism.

2. An apparatus as defined in claim 1 wherein said combustion-retardant material comprises a granular material.

3. An apparatus as defined in claim 1 wherein said surge protection device additionally comprises a visual indicator disposed within said housing for indicating whether said disconnect mechanism has operated to conductively disconnect one of said protector terminals from one of said device terminals and wherein said housing has a viewing port to allow viewing of said visual indicator.

4. An apparatus as defined in claim 3 wherein said visual indicator comprises a light-emitting diode.

5. An apparatus as defined in claim 1 wherein said separator comprises a separator plate.

6. An apparatus as defined in claim 1 additionally comprising a venting mechanism for allowing venting of gas from said internal space within said housing to a point outside said housing.

7. An apparatus as defined in claim 6 wherein said venting mechanism comprises:

a hollow passageway disposed in said housing; and a rupturable membrane which seals said hollow passageway.

8. An apparatus as defined in claim 6 wherein said venting mechanism comprises:

a hollow passageway fluidly connected between said second space within said housing and a point outside of said housing; and a rupturable membrane which seals said hollow passageway.

9. A surge protector module, comprising:

a housing having an internal space;

a separator disposed within said housing which divides said internal space into a first space within said housing and a second space within said housing;

a first surge protection device disposed within said housing, said first surge protection device having a pair of device terminals, said first surge protection device comprising:

a surge protector mounted within said first space within said housing, said surge protector having a pair of protector terminals one of which is conductively connected to one of said device terminals and another of which is conductively connected to another of said device terminals; and a disconnect mechanism operable to conductively disconnect one of said protector terminals from one of said device terminals in the presence of a prolonged overvoltage surge across said protector terminals, said disconnect mechanism being mounted within said second space within said housing;

a second surge protection device disposed within said housing, said second surge protection device having a pair of device terminals, said second surge protection device comprising:

a surge protector mounted within said first space within said housing, said surge protector of said second surge protection device having a pair of protector terminals one of which is conductively connected to one of said device terminals of said second surge protection device and another of which is conductively connected to another of said device terminals of said second surge protection device; and a disconnect mechanism operable to conductively disconnect one of said protector terminals of said second surge protection device from one of said device terminals of said second surge protection device in the presence of a prolonged overvoltage surge across said protector terminals of said second surge protection device, said disconnect mechanism of said second surge protection device being mounted within said second space within said housing; and a combustion-retardant material disposed within said housing, said combustion-retardant material occupying said first space within said housing while leaving said second space within said housing substantially free of said combustion-retardant material.

10. An apparatus as defined in claim 9 wherein said combustion-retardant material comprises a granular material.

11. An apparatus as defined in claim 9 wherein each of said surge protection devices additionally comprises a visual indicator disposed within said housing for indicating whether one of said disconnect mechanisms has operated to conductively disconnect one of said protector terminals from one of said device terminals and wherein said housing has a viewing port to allow viewing of said visual indicators.

12. An apparatus as defined in claim 11 wherein each of said visual indicators comprises a light-emitting diode.

13. An apparatus as defined in claim 9 wherein said separator comprises a separator plate.

14. An apparatus as defined in claim 9 additionally comprising a venting mechanism for allowing venting of gas from said internal space within said housing to a point outside said housing.

15. An apparatus as defined in claim 14 wherein said venting mechanism comprises:

a hollow passageway disposed in said housing; and a rupturable membrane which seals said hollow passageway.

16. An apparatus as defined in claim 14 wherein said venting mechanism comprises:

a hollow passageway fluidly connected between said second space within said housing and a point outside of said housing; and a rupturable membrane which seals said hollow passageway.

17. A surge protector module, comprising:

a housing having an internal space;

a separator disposed within said housing which divides said internal space into a first space within said housing and a second space within said housing;

a first surge protection device disposed within said housing, said first surge protection device having a pair of device terminals, said first surge protection device comprising:

a surge protector mounted within said first space within said housing, said surge protector having a pair of protector terminals one of which is conductively connected to one of said device terminals and another of which is conductively connected to another of said device terminals; and a disconnect mechanism operable to conductively disconnect one of said protector terminals from one of said device terminals in the presence of a prolonged overvoltage surge across said protector terminals, said disconnect mechanism being mounted within said second space within said housing;

a second surge protection device disposed within said housing, said second surge protection device having a pair of device terminals, said second surge protection device comprising:

a surge protector mounted within said first space within said housing, said surge protector of said second surge protection device having a pair of protector terminals one of which is conductively connected to one of said device terminals of said second surge protection device and another of which is conductively connected to another of said device terminals of said second surge protection device; and a disconnect mechanism operable to conductively disconnect one of said protector terminals of said second surge protection device from one of said device terminals of said second surge protection device in the presence of a prolonged overvoltage surge across said protector terminals of said second surge protection device, said disconnect mechanism of said second surge protection device being mounted within said second space within said housing;

a combustion-retardant material disposed within said housing, said combustion-retardant material occupying substantially all of said first space within said housing while leaving said second space within said housing substantially free of said combustion-retardant material;

a visual indicator disposed within said housing for indicating whether one of said disconnect mechanisms has operated to conductively disconnect one of said protector terminals from one of said device terminals and wherein said housing has a viewing port to allow viewing of said visual indicators; and a venting mechanism for allowing venting of gas from said internal space within said housing to a point outside said housing.

18. An apparatus as defined in claim 17 wherein each of said visual indicators comprises a light-emitting diode.

19. An apparatus as defined in claim 17 wherein said venting mechanism comprises:

a hollow passageway disposed in said housing; and a rupturable membrane which seals said hollow passageway.

20. An apparatus as defined in claim 17 wherein said venting mechanism comprises:

a hollow passageway fluidly connected between said second space within said housing and a point outside of said housing; and a rupturable membrane which seals said hollow passageway.

* * * * *